(12) United States Patent
Yu et al.

(10) Patent No.: US 7,417,097 B2
(45) Date of Patent: **\*Aug. 26, 2008**

(54) ORGANOMETAL COMPOUND CATALYST

(75) Inventors: Youlu Yu, Bartlesville, OK (US); Max P. McDaniel, Bartlesville, OK (US); Kathy S. Collins, Bartlesville, OK (US); Gil R. Hawley, Dewey, OK (US); Michael D. Jensen, Bartlesville, OK (US); Christopher E. Wittner, Bartlesville, OK (US); Elizabeth A. Benham, Bartlesville, OK (US); Anthony P. Eaton, Dewey, OK (US); Joel L. Martin, Bartlesville, OK (US); David C. Rohlfing, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 487 days.

This patent is subject to a terminal disclaimer.

(21) Appl. No.: 11/019,817

(22) Filed: Dec. 21, 2004

(65) Prior Publication Data

US 2006/0287447 A1 Dec. 21, 2006

Related U.S. Application Data

(60) Division of application No. 10/430,300, filed on May 7, 2003, now Pat. No. 6,833,338, which is a continuation of application No. 09/465,135, filed on Dec. 16, 1999, now abandoned.

(51) Int. Cl.
*B01J 31/38* (2006.01)
*C08F 4/44* (2006.01)

(52) U.S. Cl. ............... 526/127; 502/117; 502/118; 502/152; 502/104; 526/129; 526/160; 526/943

(58) Field of Classification Search ............... 502/104, 502/117, 118, 152; 526/127, 129, 160, 943
See application file for complete search history.

(56) References Cited

U.S. PATENT DOCUMENTS

| 5,032,562 | A | 7/1991 | Lo et al. |
| 5,126,303 | A | 6/1992 | Resconi et al. |
| 5,171,798 | A | 12/1992 | McDaniel et al. |
| 5,321,105 | A | 6/1994 | Rekers et al. |
| 5,703,181 | A | 12/1997 | Tashiro et al. |
| 5,705,578 | A | 1/1998 | Peifer et al. |
| 5,719,241 | A | 2/1998 | Razavi et al. |
| 5,885,924 | A * | 3/1999 | Ward ................... 502/402 |
| 6,121,187 | A | 9/2000 | Maier |
| 6,225,253 | B1 | 5/2001 | Debras |
| 6,239,059 | B1 | 5/2001 | Saudemont et al. |
| 6,300,271 | B1 | 10/2001 | McDaniel et al. |
| 6,833,338 | B2 * | 12/2004 | McDaniel et al. ....... 502/104 |
| 2007/0197752 | A1 | 8/2007 | McDaniel et al. |

FOREIGN PATENT DOCUMENTS

| EP | 0 628 574 | 12/1944 |
| EP | 0 416 928 | 3/1991 |
| HU | 218844 | 12/2000 |
| HU | 220239 | 11/2001 |

\* cited by examiner

*Primary Examiner*—Robert D. Harlan
(74) *Attorney, Agent, or Firm*—Merchant & Gould PC

(57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises contacting an organometal compound, an organoaluminum compound, and a treated solid oxide compound.

20 Claims, 4 Drawing Sheets

ORGANOMETAL COMPOUND CATALYST

CROSS-REFERENCE TO RELATED APPLICATIONS

This application is a divisional application of U.S. patent application Ser. No. 10/430,300 filed May 7, 2003, now U.S. Pat. No. 6,833,338 issued on Dec. 21, 2004, which is a continuation of U.S. patent application Ser. No. 09/465,135 filed Dec. 16, 1999, now abandoned, both of which are incorporated herein by reference in their entirety.

FIELD OF THE INVENTION

This invention is related to the field of organometal compound catalysts.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro organic borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

SUMMARY OF THE INVENTION

In accordance with one embodiment of this invention, a process to produce a catalyst composition is provided. The process comprises (or optionally, "consists essentially of," or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminum compound has the following general formula:

$$Al(X^5)_n(X^6)_{3-n}$$

wherein $(X^5)$ is a hydrocarbyl having from 1-20 carbon atoms;

wherein $(X^6)$ is a halide, hydride, or alkoxide;

wherein "n" is a number from 1 to 3 inclusive; and wherein the treated solid oxide compound comprises at least one halogen, titanium, and a solid oxide compound;

wherein the halogen is at least one selected from the group consisting of chlorine, bromine, and fluorine;

wherein the solid oxide compound is selected from the group consisting of alumina, aluminophosphate, aluminosilicate, aluminoborate, silica-titania, and mixtures thereof In accordance with another embodiment of this invention, a process is provided comprising contacting at least one monomer and the catalyst composition under polymerization conditions to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Figure 1:
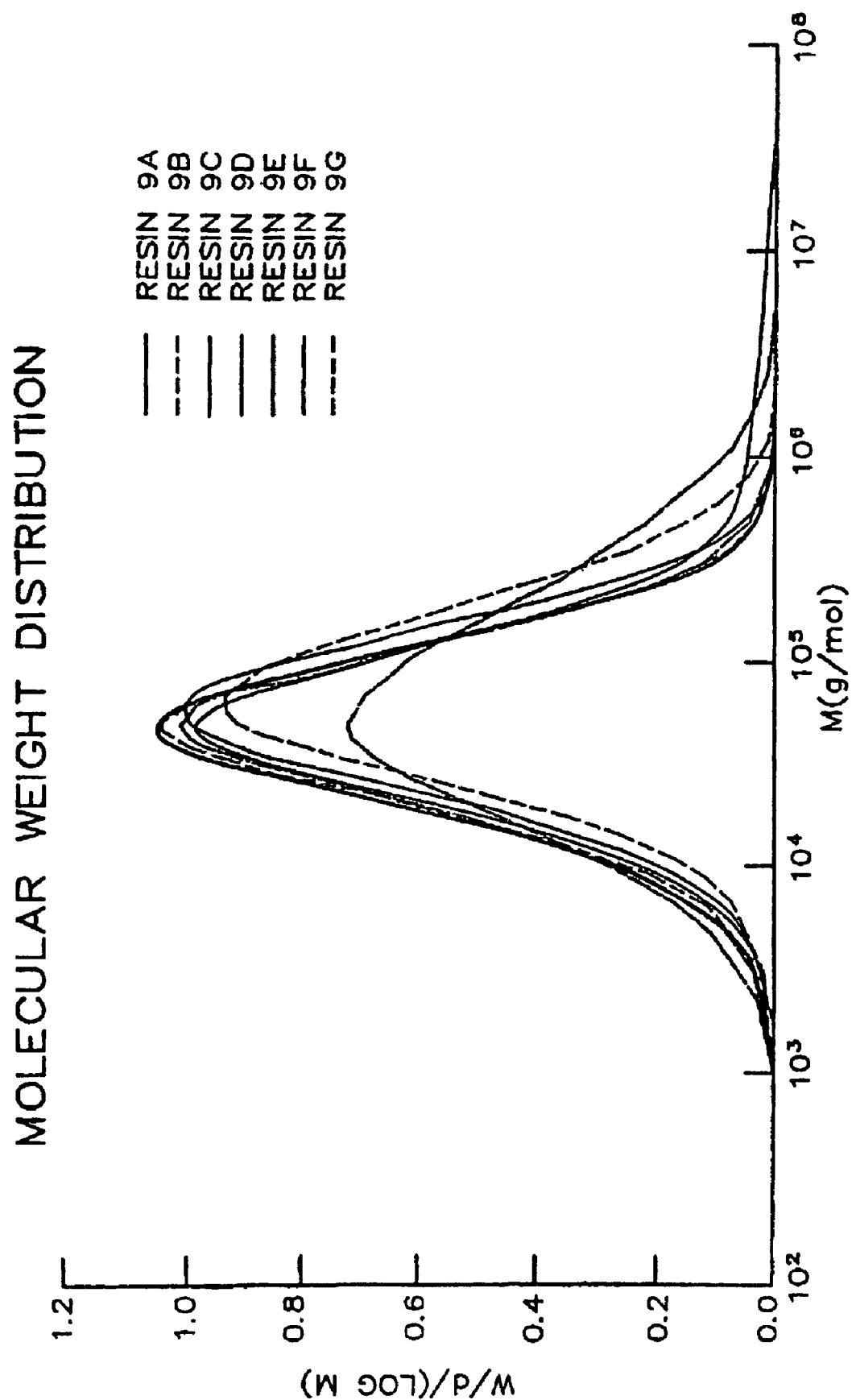
FIG. 1 is a graph showing the polymer molecular weight distribution (MWD). The normalized weight fraction per increment of log M[dW/d(log M)] is plotted as a function of the molecular weight (M) in grams per mole (g/mol), plotted on a logarithmic (log) scale.

Organometal compounds used in this invention have the following general formula:

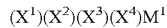

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $X(^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

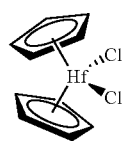

bis(cyclopentadienyl)hafnium dichloride;

-continued

bis(cyclopentadienyl)zirconium dichloride;

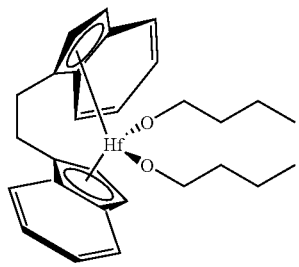

1,2-ethanediylbis($\eta^5$-1-indenyl)di-n-butoxyhafnium;

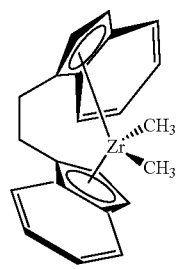

1,2-ethanediylbis($\eta^5$-1-indenyl)dimethylzirconium;

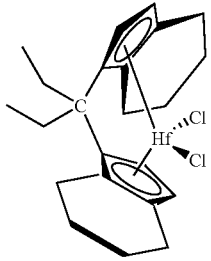

3,3-pentanediylbis($\eta^5$-4,5,6,7-tetrahydro-1-indenyl)hafnium dichloride;

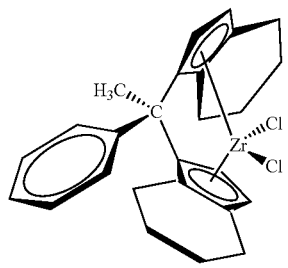

methylphenylsilylbis($\eta^5$-4,5,6,7,-tetrahydro-1-indenyl)zirconium dichloride -continued

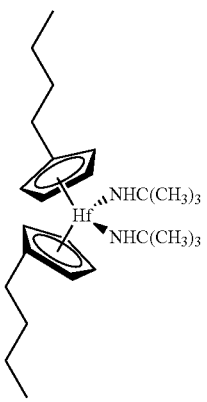

bis(n-butylcyclopentadienyl)bis(di-t-buylamido)hafnium;

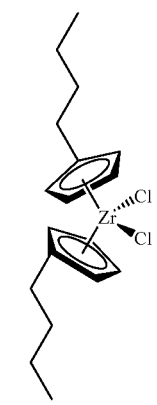

bis(n-butylcyclopentadienyl)zirconium dichloride;

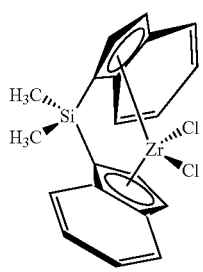

dimethylsilylbis(1-indenyl)zirconium dichloride;

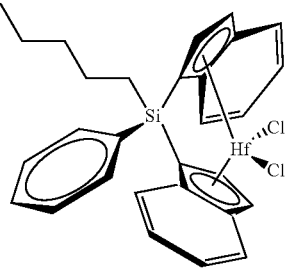

octylphenylsilylibs(1-indenyl)hafnium dichloride;

-continued

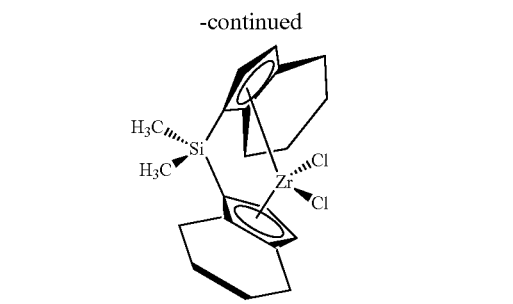

dimethylbis(η⁵-4,5,6,7-tetrahydro-1-indenyl)zirconium dichloride;

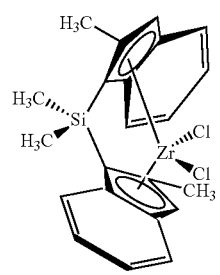

dimethylbis(2-methyl-1-indenyl)zirconium dichloride;

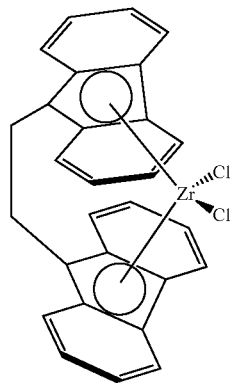

1,2-ethanediylibis(9-fluorenyl)zirconium dichloride;

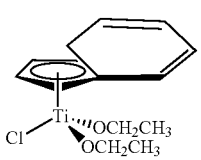

indenyl diethoxy titanium(IV) chloride;

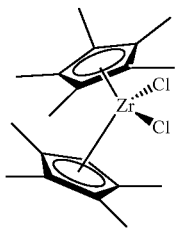

(isopropylamidodimethylsilyl)cyclopentadienyltitanium dichloride;

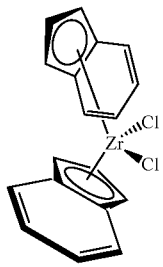

bis(pentamethylcyclopentadienyl)zirconium dichloride;

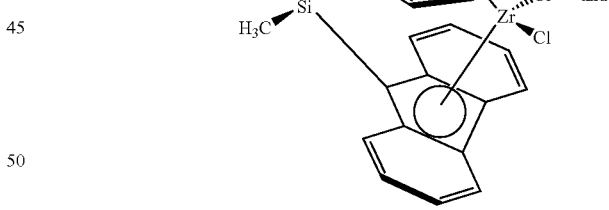

bis(indenyl)zirconium dichhloride;

methyloctylsilyl bis(9-fluorenyl)zirconium dichloride; and

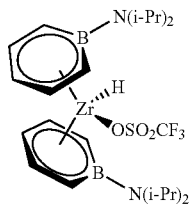

bis-[1-(N,N-diisopropylamino)boratabenzene]hydridozirconium trifluoromethylsulfonate Preferably, the organometal compound is selected from the group consisting of

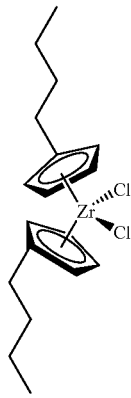

bis(n-butylcyclopentadienyl)zirconium dichloride;

bis(indenyl)zirconium dichloride;

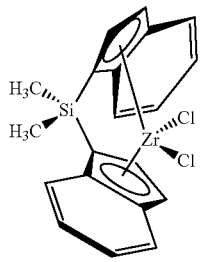

and dimethylsilylbis(1-indenyl)zirconium dichloride;

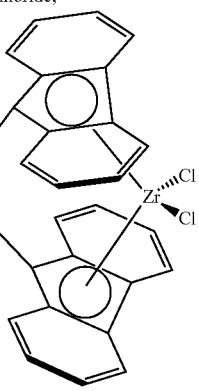

methyloctylsilylbis(9-fluorenyl)zirconium dichloride

Organoaluminum compounds have the following general formula:

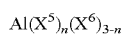

$Al(X^5)_n(X^6)_{3-n}$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
diisobutylaluminum hydride;
triisobutylaluminum hydride;
triisobutylaluminum; and
diethylaluminum chloride.

Currently, TEA is preferred.

The treated solid oxide compound comprises at least one halogen, titanium, and a solid oxide compound. The halogen is at least one selected from the group consisting of chlorine, bromine, and fluorine. Generally, the solid oxide compound is selected from the group consisting of alumina, silica, aluminophosphate, aluminosilicates, aluminoborates, silica-zirconia, silica-titania, and mixtures thereof. Preferably, the solid oxide compound is silica-alumina or alumina. The solid oxide compound can be produced by any method known in the art, such as, for example, by gelling, co-gelling, impregnation of one compound onto another, and flame hydrolysis.

When silica-titania is used, the content of titania can be about 1 to about 15% by weight titanium based on the total weight of the silica-titania, preferably, about 2.5 to about 12% by weight, and most preferably, 4 to 10% by weight, with the remainder being primarily silica. The silica-titania can be produced by any method known in the art. Such processes are disclosed in U.S. Pat. Nos. 3,887,494; 3,119,569; 4,405,501; 4,436,882; 4,436,883; 4,392,990; 4,081,407; 4,152,503; 4,981,831; 2,825,721; 3,225,023; 3,226,205; 3,622,521; and 3,625,864; the entire disclosures of which are hereby incorporated by reference. The silica-titania can be made by cogellation of aqueous materials, or by cogellation in an organic or anhydrous solution, or by coating the surface of silica with a layer of titania such as, for example, by reaction of silanol groups with titanium isopropoxide followed by calcining.

Aluminophosphate can be made by any method known in the art, such as, for example, those methods disclosed in U.S. Pat. Nos. 4,364,842; 4,444,965; 4,364,855; 4,504,638; 4,364,854; 4,444,964; 4,444,962; 4,444,966; and 4,397,765; the entire disclosures of which are hereby incorporated by reference.

Silica-alumina can be made by any method known in the art. The amount of alumina in the silica-alumina can range from about 2 to about 50% by weight based on the total weight of the silica-alumina, preferably, from about 5 to about 30% by weight, and most preferably, 8 to 20% by weight. Commercial grade silica-alumina is available as MS 13-110 from W. R. Grace and commercial grade alumina as Ketjen Grade B from Akzo Nobel.

Generally, the specific surface area of the solid oxide compound is from about 100 to about 1000 m$^2$/g, preferably, from about 200 to about 800 m$^2$/g, and most preferably, from 250 to 600 m$^2$/g after calcining at 500° C.

The specific pore volume of the solid oxide compound is typically greater than about 0.5 cm$^3$/g, preferably, greater than about 0.8 cm$^3$/g, and most preferably, greater than 1.0 cm$^3$/g.

In a first embodiment of this invention, the treated solid oxide compound is produced when the solid oxide compound is contacted with at least one titanium-containing compound and at least one halogen-containing compound. The order of contacting the solid oxide compound with the titanium-containing compound and the halogen-containing compound can vary.

To produce the treated solid oxide compound, at least one titanium-containing compound is contacted with the solid oxide compound by any means known in the art to produce a titanium-containing solid oxide compound. Titanium can be added to the solid oxide compound before, during, or after calcining. Generally, the amount of titanium present in the titanium-containing solid oxide compound is in a range of about 0.01 to about 10 weight percent titanium where the weight percent is based on the weight of the titanium-containing solid oxide compound. Preferably, the amount of titanium present in the titanium-containing solid oxide compound is in a range of about 0.1 to about 5 weight percent titanium based on the weight of the titanium-containing solid oxide compound. Most preferably, the amount of titanium present in the titanium-containing solid oxide compound is in a range of 0.5 to 2 weight percent titanium based on the weight of the titanium-containing solid oxide compound.

In one method of producing a titanium-containing solid oxide compound, the solid oxide compound can be contacted with an aqueous or organic solution of the titanium-containing compound before calcining. For example, the titanium can be added to the solid oxide compound by forming a slurry of the solid oxide compound in a solution of the titanium-containing compound and a suitable solvent such as alcohol or water. Particularly suitable are one to three carbon atom alcohols because of their volatility and low surface tension. Titanium alkoxides, Ti(OR)$_4$, where R is an alkyl or aryl group having 1 to about 12 carbons, is particularly suitable as a titanium source. A suitable amount of the solution is utilized to provide the desired concentration of titanium after drying. Drying can be effected by any method known in the art. For example, said drying can be completed by suction filtration followed by evaporation, vacuum drying, spray drying, or flash drying. This method is exemplified by U.S. Pat. Nos. 4,294,724; 4,382,022; 4,402,864; 4,405,768; and 4,424,320; the entire disclosures of which are herein incorporated by reference.

In a second method, the titanium can be cogelled into the solid oxide compound when the solid oxide compound is being produced as exemplified by U.S. Pat. Nos. 3,887,494; 3,119,569; 4,405,501; and 4,436,882, the entire disclosures of which are herein incorporated by reference.

If the titanium is added before calcination, any water soluble or organic soluble titanium-containing compound is suitable that can impregnate the solid oxide compound with titanium. In a coprecipitation method, a titanium compound such as titanium halides, titanium nitrates, titanium sulfates, titanium oxalates, or alkyl titanates, for example, is incorporated with an acid or a silicate. Titanyl sulfate (TiOSO$_4$) dissolved in sulfuric acid is a particularly suitable compound. If the titanium is deposited onto the surface of an already formed solid oxide compound, titanium halides, TiX$_4$ where X is chloride or bromide, or alkyl titanates, Ti(OR)$_4$ where R is an alkyl or aryl group containing 1 to about 12 carbons are preferred.

If the titanium is added during calcining, one convenient method is to vaporize a volatile titanium-containing compound, such as titanium tetrachloride or titanium tetrafluoride, or an alkyl titanate (Ti(OR)$_4$ where R is an alkyl or aryl group containing 1 to about 12 carbons, into a gas stream used to contact the solid oxide compound.

If the titanium is added after calcining, a preferred method is to impregnate the solid oxide compound with a hydrocarbon solution of the titanium-containing compound, preferably a titanium halide or titanium alkoxyhalide, such as TiCl$_4$, TiORCl$_3$, Ti(OR)$_2$Cl$_2$, and the like, where R is an alkyl or aryl group having 1 to about 12 carbons.

Calcining is conducted at various steps in the production of the treated solid oxide compound. Generally, calcining is conducted for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

To produce the treated solid oxide compound, the solid oxide compound is also contacted with at least one halogen-containing compound. The halogen-containing compound is at least one selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at about 100° C. to about 900° C. before being contacted with the halogen-containing compound.

Any method of fluoriding the solid oxide compound known in the art can be used in this invention. A common method is to impregnate the solid oxide compound with an aqueous solution of a fluoride-containing salt before calcining, such as ammonium fluoride [NH$_4$F], ammonium bifluoride [NH$_4$HF$_2$], hydrofluoric acid [HF], ammonium silicofluoride [(NH$_4$)$_2$SiF$_6$], ammonium fluoroborate [NH$_4$BF$_4$], ammonium fluorophosphate [NH$_4$PF$_6$], and mixtures thereof.

In a second method, the fluorine-containing compound can be dissolved into an organic compound, such as an alcohol, and added to the solid oxide compound before calcining to minimize shrinkage of pores during drying. Drying can be accomplished by an method known in the art, such as, for example, vacuum drying, spray drying, flashing drying, and the like.

In a third method, the fluorine-containing compound can be incorporated into the gel formed when producing a solid oxide compound by adding it to at least one of the solutions before gellation. Alternatively, the fluorine-containing compound can be added to the gel before drying. Gellation methods to produce a solid oxide compound were discussed previously in this disclosure.

In a fourth method, the fluorine-containing compound can be added during calcining. In this technique, the fluorine-containing compound is vaporized into the gas stream used to fluidize the solid oxide compound so that it is fluorided from the gas phase. In addition to some of the fluorine-containing compounds described previously, volatile organic fluorides can be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300° C. to about 600° C. in air or nitrogen. Inorganic fluorine-containing compounds can also be used, such as hydrogen fluoride or even elemental fluorine.

The amount of fluorine present on the treated solid oxide compound is about 2 to about 50 weight percent fluorine based on the weight of the treated solid oxide compound before cacining or the amount added to a precalcined solid oxide compound. Preferably, it is about 3 to about 25 weight percent, and most preferably, it is 4 to 20 weight percent fluorine based on the weight of the treated solid oxide compound before calcining or the amount added to a precalcined solid oxide compound.

Any method of contacting the solid oxide compound with the chlorine-containing compound or the bromine-containing compound known in the art can be used in this invention. Generally, the contacting is conducted during or after calcining, preferably during calcining. Any suitable chlorine-containing compound or bromine-containing compound that can deposit chlorine or bromine or both on the solid oxide compound can be used. Suitable chlorine-containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuiyl chloride, hydrogen bromide, boron tribromide, silicon tetrabromide, and mixtures thereof. Additionally, chlorine and bromine gas can be used. Optionally, a fluorine-containing compound can also be included when contacting the zirconium-containing solid oxide compound with the chlorine-containing compound or bromine-containing compound to achieve higher activity in some cases.

If an inorganic chlorine-containing compound or bromine-containing compound is used, such as titanium tetrachloride, aluminum trichloride, or boron trichloride, it can also be possible to achieve the chloriding or bromiding after calcining, either by vapor phase deposition or even by using an anhydrous solvent.

The amount of chlorine or bromine used can be from about 0.01 to about 10 times the weight of the treated solid oxide compound before calcining or the amount added to a precalcined solid oxide compound, preferably it is from about 0.05 to about 5 times, most preferably from 0.05 to 1 times the weight of the treated solid oxide compound before calcining or the amount added to a precalcined solid oxide compound.

Generally, the solid oxide compound is contacted with the chlorine-containing compound or bromine-containing compound at a temperature in the range of about 25° C. to about 1000° C., preferably from about 200° C. to 700° C., and most preferably from 300° C. to 600° C.

In another embodiment of this invention, an additional compound can be added to the treated solid oxide compound to enhance the activity of the organometal compound. For example, an additional metal, such as, zinc, silver, copper, antimony, gallium, tin, nickel, tungsten, and mixtures thereof, can be added by contacting the treated solid oxide compound with a metal-containing compound. This is especially useful if the solid oxide compound is to be chlorided during calcining. When used, these metals are added in an amount of about 0.01 to about 10 millimoles per gram of treated solid oxide compound, preferably about 0.1 to about 5 millimoles per gram, and most preferably from 0.5 to 3 millimoles of metal per gram of treated solid oxide compound.

Preferably, magnesium is added to the treated solid oxide compound to increase the activity of the titanium component of the catalyst composition by contacting the treated solid oxide compound with a magnesium-containing compound. The amount of magnesium used can be from about 0.01 to about 10 millimoles per gram of treated solid oxide compound, preferably from about 0.1 to about 5 millimoles per gram, most preferably from 0.1 to 1 millimoles per gram of treated solid oxide compound. If magnesium is added, it can be added before or after calcining. One preferred method of adding magnesium is to contact an organomagnesium compound in a hydrocarbon solution with the treated solid oxide compound. Examples of such compounds include, but are not limited to, dialkyl magnesium, alkyl magnesium halide, magnesium alkoxide or aryloxides, and the like.

The catalyst compositions of this invention can be produced by contacting the organometal compound, the organoaluminum compound, and the treated solid oxide compound, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the treated solid oxide compound together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. Preferably, the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The composition of this invention has an activity greater than a composition that uses the same organometal compound, and the same organoaluminum compound, and the same solid oxide compound but without contacting the solid oxide compound with a halogen. The activity is measured under slurry polymerization conditions, using isobutane as the diluent, and with a polymerization temperature of about 50° C. to about 110° C., and an ethylene pressure of about 400 to about 800 psig. When comparing activities, the polymerization runs should occur at the same polymerization conditions. The reactor should have substantially no indication of any wall scale, coating or other forms of fouling.

Preferably, the activity of the catalyst composition of this invention is greater than about 300 grams of polymer per gram of treated solid oxide compound per hour, more preferably greater than about 500, even more preferably greater than 1000, and most preferably greater than 4000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro organic borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or fluoro organic borate compounds. It should be noted that organochromium compounds and $MgCl_2$ are not needed in order to form the catalyst composition. Although aluminoxane, fluoro organic borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 micrometers, preferably about 25 to about 500 micrometers, and most preferably, 50 to 200 micrometers, for best control during polymerization.

In a more specific embodiment of this invention, a process is provided to produce a catalyst composition, the process comprising (optionally, "consisting essentially of", or "consisting of"):

(1) contacting silica-alumina with a solution containing ammonium bifluoride to produce a fluorided silica-alumina having from 4 to 20 weight percent fluorine based on the weight of the silica-alumina before calcining;

(2) calcining the fluorided silica-alumina at a temperature within a range of 350° C. to 600° C. for 3 to 20 hours to produce a calcined fluorided silica-alumina;

(3) contacting the calcined fluorided silica-alumina with a solution containing titanium tetrachloride to produce a fluorided, titanium-containing silica-alumina having 0.1 to 2% by weight titanium based on the weight of the fluorided, titanium-containing silica-alumina;

(4) combining the fluorided, titanium-containing silica-alumina and bis(n-butylcyclopentadienyl) zirconium dichloride at a temperature within a range of 15° C. to 80° C. for about 1 minute to 1 hour to produce a mixture; and (5) combining the mixture and triethylaluminum to produce the catalyst composition.

In yet another more specific embodiment, a process is provided to produce a catalyst composition, the process comprising (optionally, "consisting essentially of", or "consisting of"):

(1) contacting silica-alumina with a solution containing ammonium bifluoride to produce a fluorided silica-alumina having from 4 to 20 weight percent fluorine based on the weight of the silica-alumina before calcining;

(2) calcining the fluorided silica-alumina at a temperature within a range of 350 to 600° C. for 3 to 20 hours to produce a calcined fluorided silica-alumina;

(3) contacting the calcined fluorided silica-alumina with a solution containing dibutyl magnesium and a solution containing titanium tetrachloride to produced a fluorided, magnesium and titanium-containing silica alumina having 0.1 to 2% by weight titanium based on the weight of the fluorided, titanium-containing silica-alumina and 0.1 to 1 millimole of magnesium per gram of fluorided, magnesium and titanium-containing silica alumina.

(4) combining the fluorided, magnesium and titanium-containing silica alumina and bis(n-butylcyclopentadienyl) zirconium dichloride at a temperature within a range of 15° C. to 80° C. for about 1 minute to 1 hour to produce a mixture; and (5) combining the mixture and triethylaluminum to produce the catalyst composition.

Hydrogen can be used with this invention in a polymerization process to control polymer molecular weight.

One of the features of this invention is that the titanium-containing solid oxide compound is a polymerization catalyst in its own right, providing a high molecular weight component onto the metallocene-produced (and usually symmetrical) polymer molecular weight distribution. This component, resulting in a skewed molecular weight distribution, imparts higher melt strength and shear response to the polymer than could not be obtained from an organometal compound alone. The polymers produced by this invention have melt indices ranging from about 0.01 to about 100 grams per 10 minutes (g/10 min), preferably, from about 0.1 to about 10 g/10 min, and most preferably from 0.5 to 5 g/10 min. The densities of these inventive polymers range from about 0.90 to about 0.97 g/cm$^3$, preferably from about 0.905 to about 0.94 g/cm$^3$, and most preferably from 0.91 to 0.93 g/cm$^3$. The molecular mass distribution moment ratio ($M_w/M_n$) ranges from about 2.5 to about 20, preferably from about 3 to about 15, and more preferably, from 3.5 to 10. The ratio of the z-averaged molecular weight to the weight-averaged molecular weight, $M_z/M_w$, ranges from about 3 to about 100, preferably from about 5 to about 80, and more preferably from 10 to 60. The shear stress response ratio (HLMI/MI of the polymer ranges from about 10 to less than about 250, preferably to less than about 100, more preferably to less than 25 and most preferably to less than 20.

The polymer can also be characterized by its molecular weight distribution and by the magnitude of the complex viscosity [$|\eta^*(\omega)|$] and the storage shear modulus [$G'(\omega)$] of the polymer melt. The polymer has a molecular weight distribution comprising a large narrow peak centered below 100,000 and a small high molecular weight component that extends to molecular weights above 10,000,000 where the percentage of the mass above 1,000,000 ranges from about 0.2 to about 4% of the mass of the polymer. The presence of the high molecular weight component can be confirmed by using a viscosity detector in addition to a concentration detector in a size exclusion chromatography instrument. In addition, the slope of a log G' (storage modulus) versus log ω (angular frequency) curve of the inventive polymer increases with angular frequency over some part of the range when the angular frequency is increased from about 0.03 to about 100 rad/s. This polymer characteristic can also be described in that the second derivative of a log G' (storage modulus) versus log ωr (angular frequency) curve of the inventive polymer has a segment that is positive over the angular frequency range of about 0.03 to about 100 rad/s. Furthermore, in the more pronounced cases, the slope of the log $|\eta^*(\omega)|$ (viscosity) versus log ω (angular frequency) curve for the inventive polymer has a range where it increases (becomes less negative) as the angular frequency increases from about 0.03 to about 1.0 rad/s.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Test Methods

Specific Surface Area And Specific Pore Volume

A "Quantachrome Autosorb-6 Nitrogen Pore Size Distribution Instrument" was used to determined the specific surface area ("surface area") and specific pore volume ("pore volume") of the solid oxide compounds. This instrument was acquired from the Quantachrome Corporation, Syosset, N.Y.

Melt Index

Melt index (MI, g/10 min) was determined in accordance with ASTM D1238 at 190° C. with a 2.16 kg weight.

High Load Melt Index

High load melt index (HLMI, g/10 min) was determined in accordance with ASTM D1238 at 190° C. with a 2.16 kg.

Melt Viscosity

Polymer fluff samples were stabilized with 0.1 wt % BHT (butylated hydroxytoluene) dispersed in acetone and then vacuum dried before molding. The samples were then compression molded at 182° C. for a total of three minutes. The samples were allowed to melt at a relatively low pressure for one minute and then subjected to a high molding pressure for an additional two minutes. The molded samples were then quenched in a press maintained at room temperature. 2 mm×25.4 mm diameter disks were stamped out of the molded samples for rheological characterization.

Small-strain oscillatory shear measurements were performed on a Rheometrics-Scientific model RMS 800 rheometer using parallel-plate geometry. The test chamber of the rheometer was blanketed in nitrogen in order to minimize polymer degradation. The rheometer was preheated to the initial temperature of the study. Upon sample loading and after oven thermal equilibration, the disks were squeezed between the plates to a 1.6 mm thickness and the excess was trimmed. A total of 8.0 minutes elapsed between the time the disk was inserted between the plates and the time a frequency sweep was started.

Strains were generally maintained at a constant value throughout a frequency sweep but larger strain values were used for low viscosity samples to maintain a measurable torque. Smaller strain values were used for high viscosity samples to avoid overloading the torque transducer and to keep within the linear viscoelastic limits of the disk. The rheometer automatically reduced the strain at high frequencies if necessary to keep from overloading the torque transducer.

Molecular Weight

Molecular weights and molecular weight distributions were obtained from a Waters 150 CV or 150 CV Plus Gel Permeation Chromatograph (GPC) using trichlorobenzene as the solvent with a flow rate of 1 milliliter per minute at a temperature of 140° C. BHT at a concentration of 0.5 grams per liter was used as a stabilizer in the solvent. Both a differential refractive index detector and a solution viscosity detector were utilized. An injection volume of 220 microliters was used with a nominal polymer concentration of 3.5 to 6.5 milligrams of polymer per 3.5 milliliters of solvent (at room temperature). The column set consisted of two Waters Styragel HMW 6E mixed-bed columns. A broad-standard integral method of universal calibration was used based on a Phillips Marlex® BHB 5003 broad linear polyethylene standard. Parameter values used in the Mark-Houwink equation ($[\eta]=K \cdot M^{\alpha}$) for polyethylene were $K=39.5(10^{-3})$ mL/g and $\alpha=0.726$.

Solid Oxide Compounds

Silica was obtained from W. R. Grace, grade 952, having a pore volume of about 1.6 cm$^3$/g and a surface area of about 300 m$^2$/g.

Alumina sold as Ketjen grade B alumina was obtained from Akzo Nobel Chemical having a pore volume of about 1.78 cm$^3$/g and a surface area of about 350 m$^2$/g.

Silica-alumina was obtained from W. R. Grace as MS 13-110 containing about 13% by weight alumina and 87% by weight silica. The silica-alumina had a pore volume of about 1.2 cm$^3$/g and a surface area of about 450 m$^2$/g.

Calcining

To calcine the solid oxide compounds, about 10 grams were placed in a 1.75 inch quartz tube fitted with a sintered quartz disk at the bottom. While the solid oxide compound was supported on the disk, dry air was blown up through the disk at a rate of about 1.6 to about 1.8 standard cubic feet per hour. An electric furnace around the quartz tube was then turned on, and the temperature was raised at the rate of 400° C. per hour to the indicated temperature, such as 600° C. At that temperature, the solid oxide compound was allowed to fluidize for three hours in the dry air. Afterward, the solid oxide compound was collected and stored under dry nitrogen, where it was protected from the atmosphere until ready for testing. It was never allowed to experience any exposure to the atmosphere.

Polymerization Runs

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree Celsius, with the help of electronic control instruments.

Unless otherwise stated, a small amount (0.01 to 0.10 grams normally) of the solid oxide compound or the inventive treated solid oxide compound was first charged under nitrogen to the dry reactor. Next, 2.0 milliliters of a toluene solution containing 0.5 percent by weight of bis(n-butylcyclopentadienyl) titanium dichloride were added, followed by 0.6 liter of isobutane liquid. Then, 1.0 milliliter of a 1.0 molar solution of triethyl aluminum (TEA) was added, followed by another 0.6 liter of isobutane liquid. Then, the reactor was heated up to the specified temperature, typically 90° C., and finally ethylene was added to the reactor to equal a fixed pressure, generally 550 psig. The reaction mixture was allowed to stir for usually about one hour. As ethylene was consumed, more ethylene flowed in to maintain the pressure. The activity was noted by recording the flow of ethylene into the reactor to maintain the set pressure.

After the allotted time, the ethylene flow was stopped, and the reactor slowly depressurized and opened to recover a granular polymer. In all cases, the reactor was clean with no indication of any wall scale, coating, or other forms of fouling. The polymer was then removed and weighed. Activity was specified as grams of polymer produced per gram of solid oxide compound or treated solid oxide compound charged per hour.

Description of Results

Specific examples of this invention are described subsequently. The results of these polymerization tests are listed in Tables 1 and 2.

Example 1

Control 1-A (Chlorided Alumina)

Ketjen Grade B alumina was calcined in dry air at 600° C. for three hours. A sample of the alumina weighing 9.3 grams was heated to 600° C. under dry nitrogen and held at that temperature another three hours. Then, 2.3 milliliters of carbon tetrachloride were injected into the nitrogen stream below the alumina, where it was vaporized and carried up through the alumina bed to produce a chlorided alumina. After substantially all of the carbon tetrachloride had evaporated, the chlorided alumina was cooled to room temperature under nitrogen, then stored in an air-tight glass vessel until used for a polymerization test.

When charged to the reactor with an organometal compound and triethylaluminum (TEA), the chlorided alumina was found to yield an activity of 1627 grams of polymer per gram of chlorided alumina per hour. The polymer had a MI of 0.27, a HLMI of 4.3, and a HLMI/MI ratio of 16, reflecting the narrow molecular weight distribution which is typical of metallocene-produced polymer.

Control 1-B (Chlorided, Titanium-Containing Alumina)

Ketjen Grade B alumina was calcined in dry air at 600° C. for three hours. A sample of the alumina weighing 18.81 grams was impregnated with a solution made up of 4 milliliters of titanium ethoxide and 34 milliliters of dry heptane to produce a titanium-containing alumina. This amounts to 1 millimole of titanium per gram of alumina. Then, the heptane was evaporated under nitrogen while being warmed, and the titanium-containing alumina was calcined under nitrogen in a fluidized bed to 600° C. Three (3) milliliters of carbon tetrachloride were injected into the nitrogen stream to produce a chlorided, titanium-containing alumina. The chlorided, titanium-containing alumina was stored under nitrogen at room temperature.

A small sample of the chlorided, titanium-containing alumina was then tested for polymerization activity with TEA but in the absence of an organometal compound. It exhibited a low activity equal to 29 grams of polymer per gram of chlorided, titanium-containing alumina per hour. The polymer was found to have a MI and HLMI of zero, which is expected from polymer produced from the chlorided, titanium-containing alumina under these conditions.

Inventive Example 1-C (Chlorided, Titanium-Containing Alumina)

The chlorided, titanium-containing alumina produced in Example 1-B was retested for polymerization activity, except that an organometal compound was added to the reactor. It yielded a much improved activity of 3927 grams of polymer per gram of chlorided, titanium-containing alumina per hour. Since the activity of this sample was over twice that of Control Example 1-A, and since the polymer amount produced from the chlorided, titanium-containing alumina is very small, as demonstrated in the control run of Example 1-B, it is apparent that the presence of the titanium to activate the organometal compound is a major enhancement. However, it is also apparent that the polymer from this inventive catalyst composition contains polymer produced from the organometal compound and from the chlorided, titanium-containing alumina. The MI (0.12 g/10 min) and HLMI (2.5 g/10 min) have both decreased compared to the use of an organometal compound alone as in Control Example 1-A, indicating the high molecular weight polymer component from the chlorided, titanium-containing alumina. This is also evident from the increased HLMI/MI ratio (21), indicating a broadened polymer molecular weight distribution. The titanium itself thus contributed a high molecular weight component equal to about 0.7% of the total polymer molecular weight distribution.

Example 2

Inventive Example 2-A

Chlorided, Titanium-Containing Alumina

Ketjen Grade B alumina was calcined in dry air at 400° C. for three hours. A sample of the alumina weighing 9.53 grams was heated to 600° C. under dry nitrogen and held at that temperature another three hours. Then, 4.8 milliliters of titanium tetrachloride were injected into the nitrogen stream below the alumina, where it was vaporized and carried up through the alumina bed to produce a chlorided, titanium-containing alumina. After substantially all of the titanium tetrachloride had evaporated, the chlorided titanium-containing alumina was cooled to room temperature under nitrogen, then stored in an air-tight glass vessel until used for a polymerization test.

A sample was then tested for polymerization activity. It was charged to the reactor with an organometal compound, triethylaluminum (TEA), and enough hydrogen to equal about 0.1 mole percent of the slurry liquid. It was found to yield an activity of 562 grams of polymer per gram of chlorided, titanium-containing alumina per hour. The presence of hydrogen usually lowers the activity of the catalyst composition. The polymer had a MI and HLMI of 0 indicating an extremely high molecular weight as would be expected if the titanium also contributed to the activity of the catalyst composition. Gel permeation chromatography indicated a weight-average molecular weight ($M_w$) of 1,725,000 g/mol and a number-average molecular weight ($M_n$) of 121,000. This gives a $M_w/M_n$ ratio of 14.3 instead of the usual 2.3 obtained from metallocenes.

Control 2-B (Chlorided, Titanium-Containing Silica)

Davison Grade 952 silica was calcined in dry air at 400° C. for three hours. A sample of the silica weighing 9.26 grams was heated to 400° C. under dry nitrogen and held at that temperature another three hours. Then, 8.0 milliliters of titanium tetrachloride were injected into the nitrogen stream below the alumina, where it was vaporized and carried up through the silica bed to produce a chlorided, titanium-containing silica. After substantially all of the titanium tetrachloride had evaporated, the chlorided titanium-containing silica was cooled to room temperature under nitrogen, then stored in an air-tight glass vessel until used for a polymerization test. When charged to the reactor with an organometal compound and TEA, it was found to yield an activity of only 77 grams of polymer per gram of chlorided, titanium-containing silica per hour. The polymer had a MI and HLMI of 0 g/10 min.

Example 3

Control 3-A (Fluorided Alumina)

Ketjen Grade B alumina was calcined in dry air at 600° C. for three hours. A sample of the alumina weighing 5.46 grams was heated to 600° C. under dry nitrogen. Then, 0.3 milliliters of perfluorohexane were injected into the nitrogen stream below the alumina where it was vaporized and carried up through the alumina bed to produce a fluorided alumina. After substantially all of the perfluorohexane had evaporated, the fluorided alumina was cooled to room temperature under nitrogen, then stored in an air-tight glass vessel until used for a polymerization test.

When charged to the reactor with an organometal compound and TEA, it was found to yield an activity of 187 grams of polymer per gram of fluorided alumina per hour. The polymer had a MI of 0.18, a HLMI of 3.44, and a HLMI/MI ratio of 19, reflecting the narrow molecular weight distribution which is typical of metallocene produced polymer.

Control 3-B (Fluorided Titanium-Containing Alumina)

Ketjen Grade B alumina was calcined in dry air at 600° C. for three hours. A sample of the alumina weighing 18.81 grams was impregnated with a solution made up of 4 milliliters of titanium ethoxide and 34 milliliters of dry heptane to produce a titanium-containing alumina. This amounts to 1 millimole of titanium per gram of alumina. Then, the heptane was evaporated under nitrogen with gentle warming, and 14.43 grams of the titanium-containing alumina was calcined under nitrogen in a fluidized bed to 600° C. Five milliliters of perfluorohexane were injected into the nitrogen stream and thus contacted with the titanium-containing alumina to produce a fluorided, titanium-containing alumina. Afterward, the fluorided, titanium-containing alumina was stored under nitrogen at room temperature.

A small sample of the fluorided, titanium-containing alumina was then tested for polymerization activity with TEA but in the absence of an organometal compound. It exhibited a low activity equal to 124 grams of polymer per gram of fluorided, titanium-containing alumina per hour. The polymer was found to have a MI and HLMI of zero, which is expected from polymer produced by the fluorided, titanium-containing alumina under these conditions.

Inventive Example 3-C (Fluorided Titanium-Containing Alumina)

The fluorided titanium-containing alumina produced in Example 3-B was retested for polymerization activity, except that an organometal compound was added to the reactor. It yielded a much improved activity of 1091 grams of polymer per gram of fluorided titanium-containing alumina per hour. Since the activity of this sample was over five times that of Control Example 3-A, and since the amount of polymer produced from the fluorided, titanium-containing alumina is very small, as demonstrated in Control Example 3-B, it is apparent that the presence of the titanium to activate the organometal compound is a major enhancement. However, it is also apparent that the polymer from this invention catalyst composition contains polymer produced from both the organometal compound and the fluorided, titanium-containing alumina. The MI (0.005 g/10 min) and HLMI (0.71 g/10 min) have both decreased compared to the use of an organometal compound alone in Control Example 3-A, indicating the high molecular weight polymer component from the fluorided, titanium-containing alumina. This is also evident from the high HLMI/MI ratio (142), indicating a broadened polymer molecular weight distribution. The titanium itself thus contributed a high molecular weight polymer component equal to about 10% of the total polymer.

Example 4

Control 4-A (Fluorided, Titanium-Containing Silica-Alumina)

470.83 grams of Davison MS 13-110 silica-alumina were calcined in air at 300° C. for twelve hours. Afterward, the silica-alumina was impregnated just beyond the point of incipient wetness with a solution containing 169 grams of titanium ethoxide in 500 milliliters of heptane. The mixture was shaken thoroughly to ensure uniform wetness, then dried in a vacuum oven at 140° C. with a slight nitrogen purge overnight to produce a titanium-containing silica-alumina. Then, a solution of 47 grams of ammonium bifluoride in 500 milliliters of water was added, and the mixture was again dried under vacuum at 140° C. overnight to produce a fluorided, titanium-containing silica-alumina. The fluorided, titanium-containing silica-alumina contained about 6% by weight titanium and 10% by weight ammonium bifluoride. It was then calcined in dry air for 6 hours at 450° C. When tested for polymerization activity with TEA, but no organometal compound, it produced 53 grams of polymer per gram of fluorided, titanium-containing silica-alumina per hour. The polymer had a MI of zero and a HLMI of zero.

Inventive Example 4-B (Fluorided, Titanium-Containing Silica-Alumina)

The fluorided, titanium-containing silica-alumina produced in Example 4-A was retested for polymerization activity, except that an organometal compound was added to the reactor too. It yielded a much improved activity of 4680 grams of polymer per gram of fluorided, titanium-containing silica-alumina per hour. Thus, the polymer obtained was a combination of a very small amount (about 1% by weight) of extremely high molecular weight polymer from the titanium itself, and a majority of lower molecular weight polymer from the organometal compound. The titanium itself thus contributed a high molecular weight polymer component equal to about 1% of the total polymer.

Example 5

Control 5-A (Fluorided, Titanium-Containing Silica-Alumina)

113.13 grams of Davison MS 13-110 silica-alumina were impregnated with 140 milliliters of an aqueous solution containing 11.32 grams of ammonium bifluoride to produce a fluorided silica-alumina. After being dried in a vacuum oven overnight at 140° C., it was calcined in air at 450° C. for three hours. A 0.7 gram sample of the fluorided silica-alumina was slurried in 10 milliliters of heptane to which was added 0.7 milliliters of a heptane solution containing 1 millimole of titanium tetrachloride per milliliter of solution to produce a fluorided, titanium-containing silica-alumina. The mixture was stirred for 10 minutes, then washed three times with 20 milliliters more of heptane, pouring off the excess heptane in each case. Finally, the fluorided, titanium-containing silica-alumina was dried over nitrogen while being warmed. When tested for polymerization activity with TEA, but no organometal compound, the fluorided, titanium-containing silica-alumina produced 540 grams of polymer per gram of fluorided, titanium-containing silica-alumina per hour. The polymer had a MI of zero and a HLMI of near zero.

Inventive Example 5-B (Fluorided, Titanium-Containing Silica-Alumina)

The fluorided, titanium-containing silica-alumina produced in Control Example 5-A was retested for polymerization activity, except that an organometal compound was added to the reactor. It yielded a much-improved activity of 8094 grams of polymer per gram of fluorided, titanium-containing silica-alumina per hour. The polymer had a melt index of 0.03 g/10 min and a HLMI of 3.15 g/10 min, which was somewhat lower than expected from an organometal compound because the polymer obtained was a combination of a very small amount (about 6%) of extremely high molecular weight polymer produced from the titanium itself, and a majority of lower molecular weight polymer from the organometal compound. The titanium itself thus contributed a high molecular weight polymer component equal to about 6% of the total polymer.

Example 6

Control 6-A (Chlorided, Magnesium-Containing Alumina)

23.76 grams of Ketjen grade B alumina were impregnated with 45 milliliters of an aqueous solution containing 6.10 grams of magnesium nitrate hexahydrate to produce a magnesium-containing alumina. This amounts to 1 millimole of magnesium per gram of alumina. After being dried in a vacuum oven overnight at 140° C., the magnesium-containing alumina was calcined in air at 600° C. for three hours. Then, the gas stream was changed to nitrogen, and 2.5 milliliters of carbon tetrachloride were injected into the nitrogen stream under the magnesium-containing alumina bed, where it was vaporized and carried up through the bed to produce a chlorided, magnesium-containing alumina. After substantially all of the carbon tetrachloride had evaporated, the chlorided, magnesium-containing alumina was cooled to room temperature under nitrogen, then stored in an air-tight glass vessel until used for a polymerization test.

When tested for polymerization activity with TEA and an organometal compound, the chlorided, magnesium-containing alumina yielded an activity of 166 grams of polymer per gram of chlorided, magnesium-containing alumina per hour. Thus, the presence of the magnesium seems to decrease the ability of the chlorided alumina to activate the organometal compound (compare to Control Example 1-A).

Control 6-B (Chlorided, Magnesium and Titanium-Containing Alumina)

A 7.25 gram sample of the chlorided, magnesium-containing material from Control Example 6-A was slurried in 25 milliliters of heptane to which was added 0.62 milliliters of titanium tetrachloride to produce a chlorided, magnesium and titanium-containing alumina. The mixture was heated to 80° C. and stirred for 30 minutes. The chlorided, magnesium and titanium-containing alumina was allowed to settle out, the liquid was poured off, and the chlorided, magnesium and titanium-containing alumina was washed with 3 more 25 milliliter portions of heptane at 90° C. in a similar manner to remove unadsorbed titanium. Finally, the chlorided, magnesium and titanium-containing alumina was dried over nitrogen while being warmed.

When tested for polymerization activity with TEA, but no organometal compound, the chlorided, magnesium and titanium-containing alumina produced 810 grams of polymer per gram of chlorided, magnesium and titanium-containing alumina per hour. Obviously, the presence of magnesium greatly enhances the activity of the titanium (compare to Control 1-B). The polymer had a MI of zero and a HLMI of zero.

Inventive Example 6-C (Chlorided, Magnesium and Titanium-Containing Alumina)

The chlorided, magnesium and titanium-containing alumina produced in Control Example 6-B was retested for polymerization activity, except that an organometal compound was added to the reactor. It yielded an improved activity of 1226 grams of polymer per gram of chlorided, magnesium and titanium-containing alumina per hour. The polymer obtained was a combination of a fairly large amount (about 65%) of extremely high molecular weight polymer from the titanium itself, and a minority of lower molecular weight polymer from the organometal compound. Because of the large contribution of the titanium in this example, the composite polymer also had a MI of zero and a HLMI near zero.

Example 7

Control 7-A (Chlorided Zinc and Magnesium-Containing Alumina)

30.38 grams of Ketjen grade B alumina were impregnated with 60 milliliters of an aqueous solution containing 3.04 grams of magnesium chloride hexahydrate and 3.04 grams of zinc chloride to produce a zinc and magnesium-containing alumina. After being dried in a vacuum oven overnight at 140° C., the zinc and magnesium-containing alumina was calcined in dry air at 600° C. for three hours. Then, the gas stream was changed to nitrogen, and 2.4 milliliters of carbon tetrachloride were injected into the nitrogen stream under the zinc and magnesium-containing alumina bed, where it was vaporized and carried up through the bed to produce a chlorided zinc and magnesium-containing alumina. After substantially all of the carbon tetrachloride had evaporated, the chlorided zinc and magnesium-containing alumina was cooled to room temperature under nitrogen, then stored in an air-tight glass vessel until used for a polymerization test.

When tested for polymerization activity with TEA and an organometal compound, the chlorided zinc and magnesium-containing alumina yielded an activity of 1223 grams of polymer per gram of the chlorided zinc and magnesium-containing alumina. Thus, the presence of the zinc seems to increase the ability of the chlorided, magnesium-containing alumina to activate the organometal compound (compare to Control Example 6-A). The polymer had a MI of 0.2, a HLMI of 3.6, and a HLMI/MI ratio of 17 which is characteristic of the metallocene catalysts (compare to Control Example 1-A).

Control 7-B (Chlorided, Titanium Zinc and Magnesium-Containing Alumina)

A 9.92 gram sample of the chlorided, zinc and magnesium-containing alumina from Example 7-A was slurried in 30 milliliters of heptane to which was added 15 milliliters of titanium tetrachloride to produce a chlorided titanium, zinc, and magnesium-containing alumina. The mixture was heated to 80° C. and stirred for 2 hours. The chlorided, titanium, zinc, and magnesium-containing alumina was allowed to settle out, the liquid was poured off, and the chlorided, titanium, zinc, and magnesium-containing alumina was washed with 5 more 30 milliliter portions of heptane in a similar manner to remove unadsorbed titanium. Finally, the chlorided, titanium, zinc, and magnesium-containing alumina was dried over nitrogen while being warmed.

When tested for polymerization activity with TEA, but no organometal compound, the chlorided titanium, zinc, and magnesium-containing alumina produced 919 grams of polymer per gram of chlorided, titanium, zinc, and magnesium-containing alumina per hour. Obviously, the presence of the zinc did not detract from the activity of the titanium (compare to Control Example 6-B). The polymer had a MI of zero and a HLMI of zero.

Inventive Example 7-C (Chlorided, Titanium, Zinc and Magnesium-Containing Alumina)

The chlorided, titanium, zinc, and magnesium-containing alumina produced in Control Example 7-B was retested for polymerization activity, except that an organometal compound was added to the reactor. Hydrogen was also added to the reactor to equal approximately 0.05 mole percent of the slurry liquid. This run yielded an activity of 865 grams of polymer per gram of chlorided, titanium, zinc, and magnesium-containing alumina per hour. The activity of these catalyst compositions is usually decreased somewhat by the presence of hydrogen. Thus, it is difficult to calculate the relative contributions of the titanium and organometal compound, but the polymer melt index indicates a fairly large contribution from the titanium. The composite polymer had a MI of zero and a HLMI of near zero.

Example 8

In the following preparations, Davison MS 13-110 silica-alumina was impregnated to incipient wetness with an aqueous solution containing 10% of the weight of the silica-alumina of dissolved ammonium bifluoride, as described previously in Example 4 to produce a fluorided silica-alumina. The fluorided silica-alumina was then dried in a vacuum oven overnight at 140° C. Afterward, it was calcined in air at 450° C. for three hours and stored under dry nitrogen. Then, three samples of the fluorided silica-alumina were slurried in heptane, and dibutyl magnesium was added in the amount shown in Table 2 to produce a fluorided, magnesium-containing alumina. The mixture was stirred for 10-15 minutes, and then a solution containing titanium tetrachloride in heptane was added in the amount shown in Table 2 to produce a fluorided, titanium and magnesium-containing alumina. The mixture was stirred for 10 minutes, then washed three times with more heptane, and the excess heptane was poured off in each case. Finally, the fluorided, titanium and magnesium-containing alumina was dried over nitrogen while being warmed.

As can be seen in Table 2, the three samples were made to contain different amounts of titanium and magnesium. Each of these samples was tested for polymerization activity with TEA but in the absence of an organometal compound. These runs are Examples 8-A, 8-C, and 8-E. As the titanium and magnesium concentrations increase, the activity also increases from 56 (g/g)/h, to 1070 (g/g)/h, and then to 3425 (g/g)/h. In all cases, the polymer obtained had a MI of zero and a HLMI of zero.

Then, the three samples were tested for polymerization in the presence of an organometal compound. This is also shown in Table 2 as Examples 8-B, 8-D, and 8-F. The total activity of these catalyst compositions remained relatively constant at 9000-10,000 grams of polymer per gram of fluorided, titanium and magnesium-containing silica-alumina. However, the relative contribution of the titanium increased going down the series, from less than 1% by weight for Inventive Example 8-B; to about 10% by weight for Inventive Example 8-D, to almost 50% by weight in Inventive Example 8-F. The contribution of the titanium can be seen by comparing the polymer from Examples 8-A to 8-F. The MI decreased from 0.23 in the former to zero in the latter, and the HLMI decreased from 4.2 to zero.

Example 9

The catalyst compositions described previously were also used in a loop-reactor pilot plant to prepare polymers for larger scale testing. The polymers made according to this invention were found to have higher melt strength when blown into film than film produced from typical metallocene catalysts. Seven ethylene-hexene copolymers, designated examples 9A through 9G, were prepared according to the following procedure.

Ethylene polymers were prepared in a continuous particle form process (also known as a slurry process) by contacting a catalyst composition with a monomer and optionally one or more alpha-olefin comonomers, such as 1-hexene. The medium and temperature are thus selected such that the copolymer is produced as solid particles and is recovered in that form. Ethylene that had been dried over activated alumina was used as the monomer. Isobutane that had been degassed by fractionation and dried over alumina was used as the diluent.

The reactor was a liquid-full 15.2 cm diameter pipe loop having a volume of 23 gallons (87 liters). Liquid isobutane was used as the diluent, and occasionally some hydrogen was added to regulate the molecular weight of the polymer. The reactor pressure was about 4 MPa (about 580 psi). The reactor temperature was 82° C. (180° F.). The reactor was operated to have a residence time of 1.25 hours. The components of the catalyst composition were added through a 0.35 cubic centimeter circulating ball-check feeder. At steady-state conditions, the isobutane feed rate was about 46 liters per hour, the ethylene feed rate was about 30 pounds per hour, and the 1-hexene feed rate was varied between 10 and 15 pounds per hour to control the density of the polymer. Catalyst composition concentrations in the reactor ranged from 0.001 to about 1% by weight based on the weight of the reactor contents. Polymer was removed from the reactor at the rate of about 25 pounds per hour and recovered in a flash chamber. A Vulcan dryer was used to dry the polymer under nitrogen at about 60-80° C. Triethylaluminum (TEA) was used as the organoaluminum compound at the concentrations listed subsequently. Bis-n-butylcyclopentadienyl zirconium dichloride was utilized as the organometal compound. To prevent static buildup in the reactor, a small amount (<5 ppm by weight of diluent) of a commercial antistatic agent sold as Stadis® 450 from E. I. Du Pont De Nemours and Company was usually added.

The specific characteristics of each of these seven polymers are listed below:

Polymer 9A was prepared using a fluorided silica-alumina prepared according to Example 3A. It had no titanium or magnesium. The organometal compound was added to the reactor to equal 5.9 ppm by weight based on the weight of the diluent. Triethylaluminum was added to equal 73 ppm by weight based on the weight of the diluent. Polymer 9A had a melt index of 4.04 g/10 min, a high load melt index of 70.8 g/10 min, an HLMI/MI ratio of 17.5, and a density of 0.9189 g/cm$^3$.

Polymer 9B was prepared using the treated solid oxide compound prepared in example 4. The treated solid oxide compound contained titanium but no magnesium. The organometal compound was added to equal 5.2 ppm based on the weight of the diluent. Triethylaluminum was added to equal 69 ppm based on the weight of diluent. Polymer 9B had a melt index of 3.43 g/10 min, a high load melt index of 59.4 g/10 min, an HLMI/MI ratio of 17.3, and a density of 0.9188 g/cm$^3$.

Polymer 9C was prepared using a treated solid oxide compound prepared according to Example 5B except that it contained 0.5 millimoles titanium per gram of solid oxide compound. The treated solid oxide compound had no magnesium. The organometal compound was added to equal 0.73 ppm based on the weight of the diluent. Triethylaluminum was added to equal 72 ppm based on the weight of the diluent. Polymer 9C had a melt index of 1.61 g/10 min, a high load melt index of 27.5 g/10 min, an HLMI/MI ratio of 17.1, and a density of 0.9276 g/cm$^3$.

Polymer 9D was prepared using a treated solid oxide compound prepared according to Example 5B except that it contained 0.5 millimoles titanium per gram of treated solid oxide compound. The treated solid oxide compound had no magnesium. The organometal compound was added to equal 0.69 ppm based on the weight of the diluent. Triethylaluminum was added to equal 70 ppm based on the weight of the diluent. Polymer 9D had a melt index of 2.52 g/10 min, a high load melt index of 44.8 g/10 min, an HLMI/MI ratio of 17.8, and a density of 0.9163 g/cm$^3$.

Polymer 9E was prepared using a treated solid oxide compound prepared according to Example 8, except that it represents an extreme case of titanium loading. The treated solid oxide compound contained 1.5% by weight magnesium and 1.2 millimoles of titanium per gram of treated solid oxide compound. The organometal compound was added to equal 2.7 ppm based on the weight of the diluent. Triethylaluminum was added to equal 60 ppm based on the weight of the diluent. Polymer 9E had a melt index of 0.4 g/10 min, a high load melt index of 15.5 g/10 min, an HLMI/MI ratio of 38.8, and a density of 0.9383 g/cm$^3$.

Polymer 9F was prepared using a treated solid oxide compound prepared according to Example 8. The treated solid oxide compound contained 0.05% by weight magnesium and 0.04 millimoles of titanium per gram of treated solid oxide compound. The organometal compound was added to equal 1.64 ppm based on the weight of the diluent. Triethylaluminum was added to equal 10 ppm based on the weight of the diluent. Polymer 9F had a melt index of 1.35 g/10 min, a high load melt index of 34.3 g/10 min, an HLMI/MI ratio of 25.4, and a density of 0.9273 g/cm$^3$.

Polymer 9G was prepared using a treated solid oxide compound prepared according to Example 3A. It had no titanium or magnesium. The organometal compound was added to equal 1.46 ppm based on the weight of the diluent. Triethylaluminum was added to equal 11 ppm based on the weight of the diluent. Polymer 9G had a melt index of 0.94 g/10 min, a high load melt index of 18.5 g/10 min, an HLMI/MI ratio of 19.7, and a density of 0.9184 g/cm$^3$.

Figure 2:
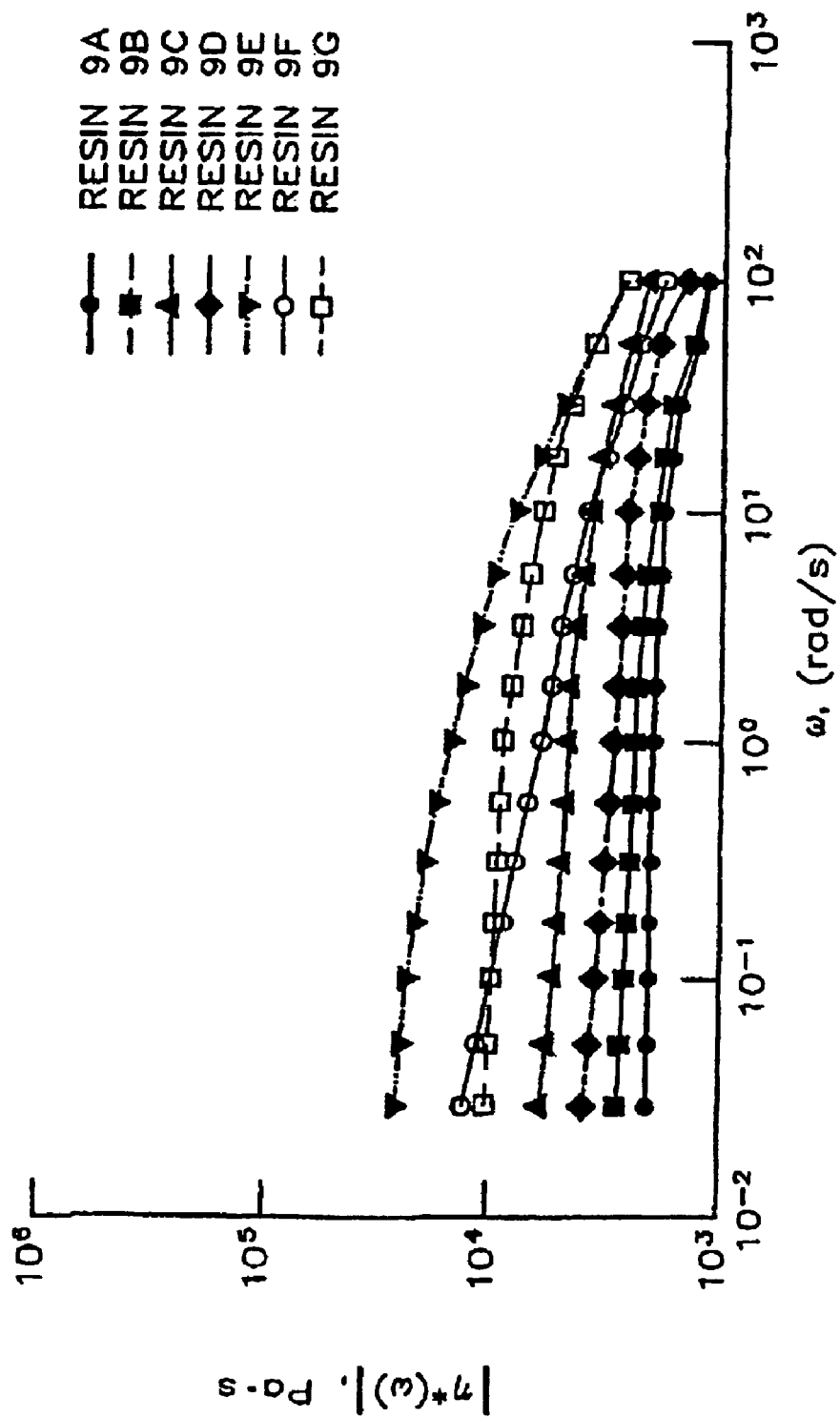
FIG. 2 is a graph of the signal of a gel permeation chromatograph of the polymer versus time.

The inventive polymers are characterized by molecular weight distributions (MWDs) that consist of large, narrow peaks centered below a molecular weight of 100,000 (e.g. 60,000) with a peak height of the normalized MWD between 0.8 and 1.1 (e.g. 0.94) and small high molecular weight components that extend to molecular weights above 10,000,000 where the percentage of the mass above 1,000,000 may be in the range of about 0.2 to about 4.0% (e.g. 3.5%) of the mass of the polymer. See Polymer 9F in the Molecular Weight Distribution Plot shown in FIG. 1. Polymers 9B, 9C, 9D also have indications of a high molecular weight component when using a viscosity detector that are nearly indistinguishable from the noise in the concentration detector (differential refractive index detector) signal. The control polymers 9A and 9G show no evidence of a high molecular weight component in either the viscosity or concentration detector signal. The high molecular weight components can also be seen in FIG. 2 which is a plot of the signal of a gel permeation chromatograph over time. The high molecular weight component of polymers 9B-9F are clearly shown in the peaks prior to the large, narrow peaks of the rest of the polymer molecular weight distribution.

The high molecular weight component of the molecular weight distribution can also be observed by the polydispersity and the ratio of the z-averaged molecular weight to the weight-averaged molecular weight ($M_z/M_w$) as shown in Table 3. The polydispersities of the control runs 9A and 9G were 2.64 and 3.13 respectively while the polydispersities of inventive runs 9B-9F ranged from 3.55 to 7.46. The high molecular weight component is even more clearly shown by $M_z/M_w$ where control runs 9A and 9G had a ratio of 2.19 and 2.44 respectively, and the inventive runs had a ratio of 9.85 to 68.91.

Dynamic melt viscosities of these polymers, with molecular weight distributions as described previously, are often characterized by an upturn in the magnitude of the logarithm of the complex viscosity, log |η*(ω)|, as the logarithm of the measurement angular frequency, log ω, decreases from 1.0 to 0.03 rad/s. That is, the slope of the log |η*(ω)| vs. log ω curve increases (becomes less negative) as the angular frequency increases from 0.03 to 1.0 rad/s. See polymer 9B in the dynamic melt viscosity versus frequency plot shown in FIG. 2. This is in contrast to the behavior typically observed in polymers without the high molecular weight component, where the viscosity tends to asymptotically approach a constant value, the zero shear viscosity, as the measurement frequency decreases. That is, the slope of the log |η*(ω)| vs. log ω curve decreases (becomes more negative) as the angular frequency increases from 0.3 to 1.0 rad/s. See Polymers 9A, 9E, and 9G in FIG. 2. This upturn may be or may not be obvious for the inventive polymers. See Polymers 9C, 9D, and 9F in FIG. 2.

Figure 3:
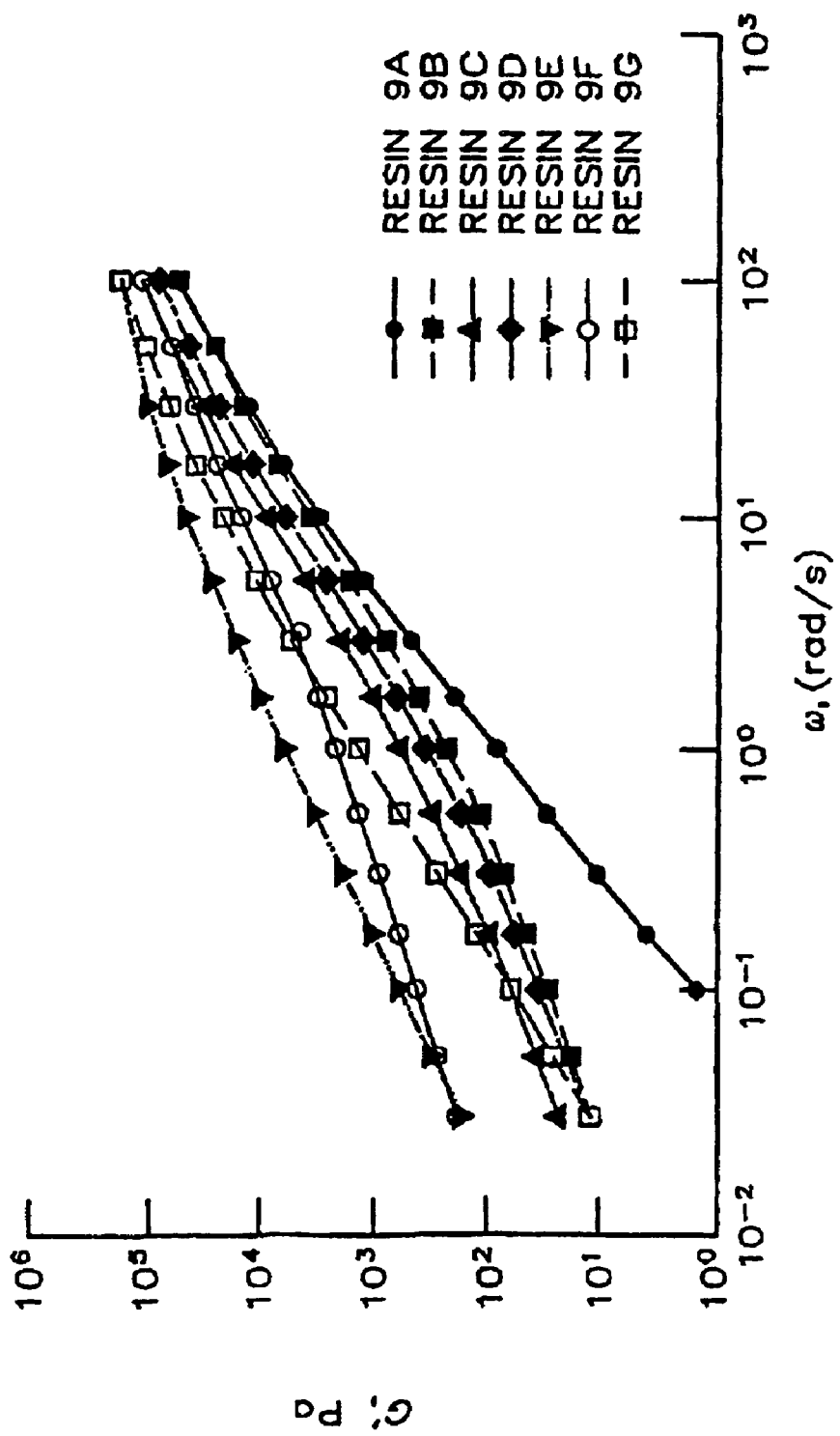
FIG. 3 is a log-log plot of the magnitude of the complex viscosity in pascal second (Pa·s) as a function of angular oscillation frequency in radians per second (rad/s).
Figure 4:
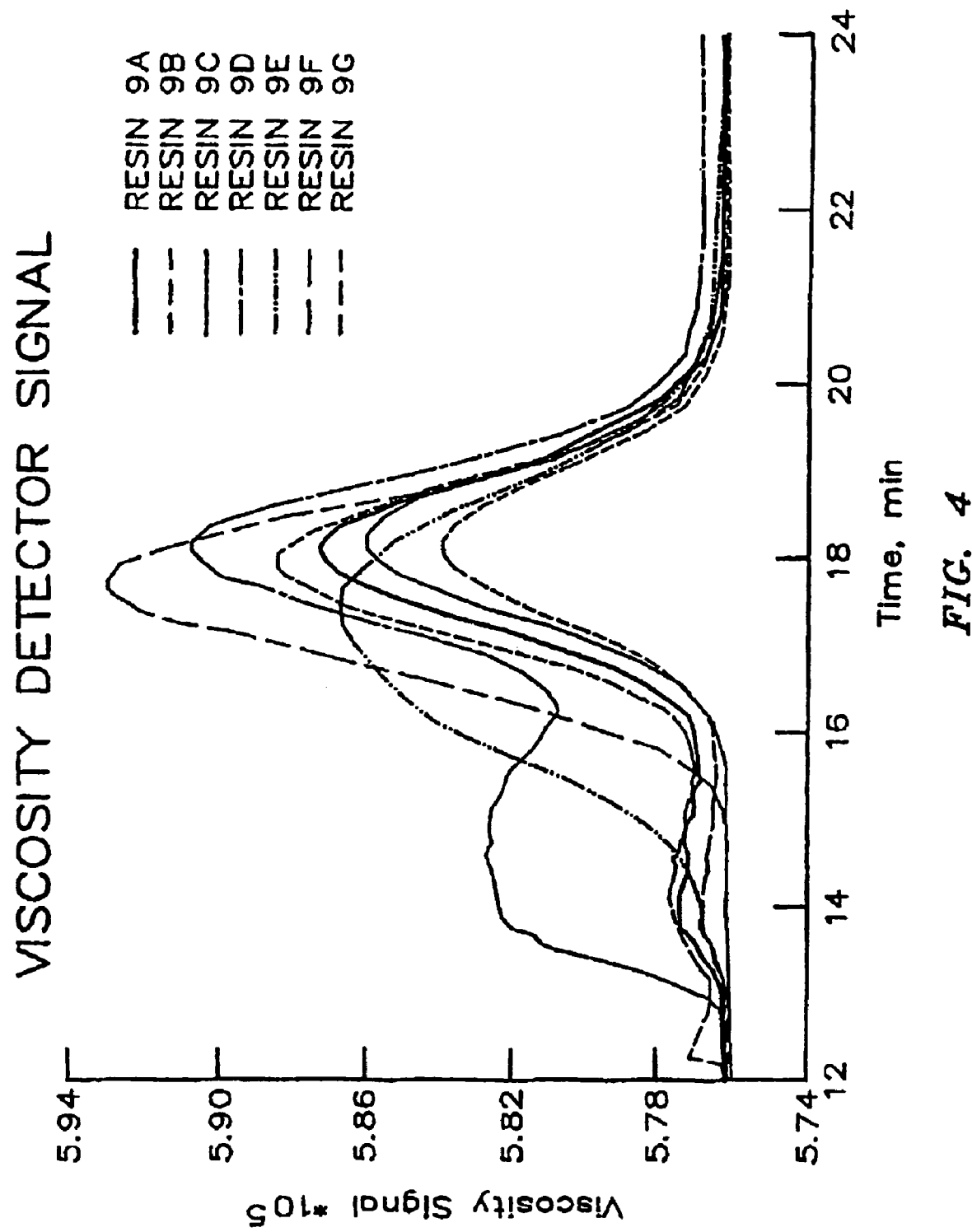
FIG. 4 is a log-log plot of the storage shear modulus in pascal second (Pa·s) as a function of the angular frequency in radian per second (rad/s).

However, even when the viscosity behavior described previously is not apparent, a characteristic of the polymers in this invention is shown in the behavior of the logarithm of the storage shear modulus curve, log G', as a function of the logarithm of the measurement frequency, log ω, is usually apparent. The log G' vs. log ω curves of these polymers are characterized by a positive inflection in these curves as one increases the measurement frequency from 0.03 to 100 rad/s, usually in the range between 0.1 to 10 rad/s. That is, the slopes of the log G' vs. log ω curves increase (become more positive) somewhere in the measurement range. This increase in slope may or may not be followed by the more usual decrease in slope as the highest measurement frequencies are approached. This behavior may also be described in that the second derivative of the log G' vs. log ω curve has a segment that is positive over the measurement range. See Polymers 9B, 9C, 9D, and 9F in the Storage Shear Modulus plot in FIG. 3.

This is in contrast to the behavior of polymers not possessing the small, high molecular weight component, where the slopes of the log G' vs. log ω curves typically tend to smoothly decrease (become less positive) over the measurement range. This more normal behavior may also be described in that the second derivative of the log G' vs. log ω curve normally is normally negative throughout the range of the measurement frequency. See Polymers 9A, 9E, and 9G in the Storage Shear Modulus plots shown in FIG. 3.

TABLE 1

Examples 1-7

| Example Units | Inventive Or Control | Test Compound | Organometal Compound | Test Compound Grams | Polymer Yield Grams | Run Time minutes | Activity* (g/g)/h | HLMI g/10 min | MI g/10 min | HLMI/MI |
|---|---|---|---|---|---|---|---|---|---|---|
| 1-A | Control | Cl-Alumina | Yes | 0.2058 | 351.5 | 63.0 | 1627 | 4.3 | 0.27 | 16 |
| 1-B | Control | Cl—Ti/Alumina | No | 0.1320 | 1.0 | 15.5 | 29 | 0 | 0 | NA |
| 1-C | Inventive | Cl—Ti/Alumina | Yes | 0.0810 | 161.0 | 30.3 | 3936 | 2.5 | 0.12 | 21 |
| 2-A | Inventive | TiCl$_4$ treated Alumina | Yes | 0.9341 | 265 | 30.3 | 562 | 0 | 0 | NA |
| 2-B | Control | TiCl$_4$ Treated Silica | Yes | 0.2200 | 17 | 60.0 | 77 | 0 | 0 | NA |
| 3-A | Control | F-Alumina | Yes | 0.2574 | 43.9 | 54.7 | 187 | 3.44 | 0.18 | 19 |
| 3-B | Control | F—Ti/Alumina | No | 0.1206 | 4.0 | 16.0 | 124 | 0 | 0 | NA |
| 3-C | Inventive | F—Ti/Alumina | Yes | 0.0673 | 41.0 | 33.5 | 1091 | 0.71 | 0.005 | 142 |
| 4-A | Control | F—Ti/Silica-Alumina | No | 0.5428 | 30.0 | 62.1 | 53 | 0 | 0 | NA |
| 4-B | Inventive | F—Ti/Silica-Alumina | Yes | 0.0350 | 178.0 | 65.2 | 4680 | | | |
| 5-A | Control | F—Ti/Silica-Alumina | No | 0.4849 | 267.0 | 61.2 | 540 | 0.03 | 0.00 | NA |
| 5-B | Inventive | F—Ti/Silica-Alumina | Yes | 0.0505 | 109.0 | 16.0 | 8094 | 3.15 | 0.16 | 19.4 |

TABLE 1-continued

Examples 1-7

| Example Units | Inventive Or Control | Test Compound | Organometal Compound | Test Compound Grams | Polymer Yield Grams | Run Time minutes | Activity* (g/g)/h | HLMI g/10 min | MI g/10 min | HLMI/MI |
|---|---|---|---|---|---|---|---|---|---|---|
| 6-A | Control | Cl—Mg/Alumina | Yes | 0.1444 | 16.0 | 40.1 | 166 | | | |
| 6-B | Control | TiCl$_4$ + Cl—Mg/Alumina | No | 0.1383 | 112.0 | 60.0 | 810 | 0 | 0 | NA |
| 6-C | Inventive | TiCl$_4$ + Cl—Mg/Alumina | Yes | 0.0514 | 63.0 | 60.0 | 1226 | 0.004 | 0 | NA |
| 7-A | Control | Cl—Zn&Mg/Alumina | Yes | 0.0548 | 67 | 60.0 | 1223 | 3.58 | 0.2 | 17.9 |
| 7-B | Control | TiCl$_4$ on Cl—Zn&Mg/Alumina | No | 0.1609 | 176 | 71.4 | 919 | 0 | 0 | NA |
| 7-C | Inventive | TiCl$_4$ on Cl—Zn&Mg/Alumina | Yes | 0.1114 | 97 | 60.4 | 865 | 0.008 | 0 | NA |

*Activity - (grams of polymer per gram of test compound)/hour.

TABLE 2

Example 8

| Example Units | Test Compound | Mg % by weight | TiCl$_4$ mmol/g of solid oxide compound | Organometal Compound | Test Compound Grams | Polymer Yield grams | Run Time Minutes | Activity* (g/g)/h | MI (g/10 min) | HLMI (g/10 min) | HLMI/MI |
|---|---|---|---|---|---|---|---|---|---|---|---|
| 8-A Control | TiCl$_4$ + MgBu$_2$ + F-Silica-Alumina | 0.03 | 0.026 | No | 0.3460 | 20 | 62.0 | 56 | 0 | 0 | NA |
| 8-B Inventive | TiCl$_4$ + MgBu$_2$ + F-Silica-Alumina | 0.03 | 0.026 | Yes | 0.0594 | 198 | 20.0 | 10000 | 0.23 | 4.18 | 18.2 |
| 8-C Control | TiCl$_4$ + MgBu$_2$ + F-Silica-Alumina | 0.20 | 0.165 | No | 0.0809 | 88 | 61.0 | 1070 | | | |
| 8-D Inventive | TiCl$_4$ + MgBu$_2$ + F-Silica-Alumina | 0.20 | 0.165 | Yes | 0.0244 | 226 | 60.0 | 9262 | | | |
| 8-E Control | TiCl$_4$ + MgBu$_2$ + F-Silica-Alumina | 1.50 | 1.24 | No | 0.0584 | 100 | 30.0 | 3425 | 0 | 0 | NA |
| 8-F Inventive | TiCl$_4$ + MgBu$_2$ + F-Silica-Alumina | 1.50 | 1.24 | Yes | 0.0335 | 219 | 45.0 | 8716 | 0 | 0 | NA |

*Activity = (grams of polymer per gram of test compound)/hour.

TABLE 3

Example 9

| Run # | Mn | Mw | Mz | $M_w/M_n$ | $M_z/M_w$ |
|---|---|---|---|---|---|
| 9A | 25.2 | 66.44 | 145.8 | 2.64 | 2.19 |
| 9B | 26.33 | 122.71 | 8455.5 | 4.66 | 68.91 |
| 9C | 32.81 | 126.79 | 3839.8 | 3.86 | 30.28 |
| 9D | 28.61 | 101.54 | 3376.9 | 3.55 | 33.26 |
| 9E | 26.01 | 182.11 | 1793.4 | 7.00 | 9.85 |
| 9F | 32.88 | 245.41 | 7606.8 | 7.46 | 31.00 |
| 9G | 35.12 | 109.86 | 268.3 | 3.13 | 2.44 |

While this invention has been described in detail for the purpose of illustration, it is not intended to be limited thereby but is intended to cover all changes and modifications within the spirit and scope thereof.

That which is claimed is:

1. A polymerization process comprising contacting at least one monomer and a catalyst composition comprising a contact product of at least one organometal compound, at least one organoaluminum compound, and at least one treated solid oxide compound under polymerization conditions to produce a polymer, wherein the at least one organometal compound has the following general formula:

$(X^1)(X^2)(X^3)(X^4)M^1$ wherein $M^1$ is titanium, zirconium, or hafnium;

wherein $(X^1)$ is independently a cyclopentadienyl, an indenyl, a fluorenyl, a substituted cyclopentadienyl, a substituted indenyl, or a substituted fluorenyl;

wherein substituents on the substituted cyclopentadienyls, substituted indenyls, and substituted fluorenyls of $(X^1)$ are aliphatic groups, cyclic groups, combinations of aliphatic and cyclic groups, silyl groups, alkyl halide groups, halides, organometallic groups, phosphorus groups, nitrogen groups, silicon, phosphorous, boron, germanium or hydrogen;

wherein at least one substituent on $(X^1)$ can be a bridging group which connects $(X^1)$ and $(X^2)$;

wherein $(X^3)$ and $(X^4)$ are independently halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, silicon, phosphorous, boron, germanium or hydrogen; and wherein at least one substituent on $(X^2)$ can be a bridging group which connects $(X^1)$ and $(X^2)$;

the at least one organoaluminum compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive; and the at least one treated solid oxide compound comprises at least one halogen, titanium, and at least one solid oxide compound;

wherein the at least one halogen is chlorine, bromine, or fluorine; and wherein the at least one solid oxide compound is alumina, aluminophosphate, aluminosilicate, aluminoborate, silica-titania, silica-zirconia, or any mixture thereof.

2. A process according to claim 1, wherein the polymerization conditions comprise slurry polymerization conditions.

3. A process according to claim 2, wherein the contacting is conducted in a loop reaction zone.

4. A process according to claim 3, wherein the contacting is conducted in the presence of a diluent that comprises, in major part, isobutane.

5. A process according to claim 1, wherein at least one monomer is ethylene.

6. A process according to claim 1, wherein at least one monomer comprises ethylene and an aliphatic 1-olefin having from 3 to about 20 carbon atoms per molecule.

7. A process according to claim 1, wherein polymerization is conducted in the presence of a chlorocarbon activation compound in a reactor zone.

8. A polymer produced in accordance with the process of claim 1.

9. An article that comprises the polymer produced according to claim 1.

10. A polymerization process comprising contacting at least one monomer and a catalyst composition comprising a contact product of at least one organometal compound, at least one organoaluminum compound, and at least one treated solid oxide compound under polymerization conditions to produce a polymer, wherein the at least one organometal compound has the following general formula:

$$(X^1)(X^2)(X^3)(X^4)M^1$$

wherein $M^1$ is titanium, zirconium, or hafnium;

wherein $(X^1)$ is independently a cyclopentadienyl, an indenyl, a fluorenyl, a substituted cyclopentadienyl, a substituted indenyl, or a substituted fluorenyl;

wherein substituents on the substituted cyclopentadienyls, substituted indenyls, and substituted fluorenyls of $(X^1)$ are aliphatic groups, cyclic groups, combinations of aliphatic and cyclic groups, silyl groups, alkyl halide groups, halides, organometallic groups, phosphorus groups, nitrogen groups, silicon, phosphorous, boron, germanium or hydrogen;

wherein at least one substituent on $(X^1)$ can be a bridging group which connects $(X^1)$ and $(X^2)$;

wherein $(X^3)$ and $(X^4)$ are independently halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, silicon, phosphorous, boron, germanium or hydrogen; and wherein at least one substituent on $(X^2)$ can be a bridging group which connects $(X^1)$ and $(X^2)$;

the at least one organoaluminum compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive; and the at least one treated solid oxide compound comprises at least one halogen, titanium, at least one additional metal, and at least one solid oxide compound;

wherein the at least one halogen is chlorine, bromine, or fluorine;

wherein the at least one solid oxide compound is alumina, aluminophosphate, aluminosilicate, aluminoborate, silica-titania, silica-zirconia, or any mixture thereof; and wherein the at least one additional metal is zinc, silver, copper, antimony, gallium, tin, nickel, tungsten, or any mixture thereof.

11. A process according to claim 1, wherein:

($X^1$) and ($X^2$) independently are a cyclopentadienyl, an indenyl, a fluorenyl, a substituted cyclopentadienyl, a substituted indenyl, or a substituted fluorenyl, and wherein each substituent on the substituted cyclopentadienyl, the substituted indenyl, or the substituted fluorenyl, independently is selected from hydrogen, methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, or phenyl; and ($X^3$) and ($X^4$) independently are a halide or a methyl group.

12. A process according to claim 1, wherein the at least one organometal compound is bis(cyclopentadienyl)hafnium dichloride; bis(cyclopentadienyl)zirconium dichloride; 1,2-ethanediylbis($\eta^5$-1-indenyl)di-n-butoxyhafnium; 1,2-ethanediylbis($\eta^5$-1-indenyl)dimethylzirconium; 3,3-pentanediylbis($\eta^5$-4,5,6,7-tetrahydro-1-indenyl)hafnium dichloride; methylphenylsilylbis($\eta^5$-4,5,6,7-tetrahydro-1-indenyl)zirconium dichloride; bis($\eta$-butylcyclopentadienyl)bis(di-t-butylamido)hafnium; bis($\eta$-butylcyclopentadienyl)zirconium dichloride; dimethylsilylbis(1-indenyl)zirconium dichloride; octylphenylsilylbis(1-indenyl)hafnium dichloride; dimethylsilylbis($\eta^5$-4,5,6,7-tetrahydro-1-indenyl)zirconium dichloride; dimethylsilylbis(2-methyl-1-indenyl)zirconium dichloride; 1,2-ethanediylbis(9-fluorenyl)zirconium dichloride; indenyl diethoxy titanium(IV) chloride; (isopropylamidodimethylsilyl)cyclopentadienyltitanium dichloride; bis(pentamethylcyclopentadienyl)zirconium dichloride; bis(indenyl) zirconium dichloride; methyloctylsilyl bis (9-fluorenyl) zirconium dichloride; or bis-[1-N,N-diisopropylamino)boratabenzene]hydridozirconium trifluoromethylsulfonate.

13. A process according to claim 1, wherein the at least one organoaluminum compound is trimethylaluminum; triethylaluminum; tripropylaluminum; tributylaluminum; or triisobutylaluminum.

14. A process according to claim 6, wherein the aliphatic 1-olefin is 1-butene, 1-pentene, 1-hexene, 1-octene, 1-decene, or a combination thereof.

15. A polymerization process comprising contacting at least one monomer and a catalyst composition comprising a contact product of at least one organometal compound, at least one organoaluminum compound, and at least one treated solid oxide compound under polymerization conditions to produce a polymer, wherein the at least one organometal compound has the following general formula:

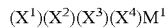

wherein $M^1$ is titanium, zirconium, or hafnium;

wherein ($X^1$) is independently a cyclopentadienyl, an indenyl, a fluorenyl, a substituted cyclopentadienyl, a substituted indenyl, or a substituted fluorenyl;

wherein substituents on the substituted cyclopentadienyls, substituted indenyls, and substituted fluorenyls of ($X^1$) are aliphatic groups, cyclic groups, combinations of aliphatic and cyclic groups, silyl groups, alkyl halide groups, halides, organometallic groups, phosphorus groups, nitrogen groups, silicon, phosphorous, boron, germanium or hydrogen;

wherein at least one substituent on ($X^1$) can be a bridging group which connects ($X^1$) and ($X^2$);

wherein ($X^3$) and ($X^4$) are independently halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;

wherein ($X^2$) is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on ($X^2$) are aliphatic groups, cyclic groups, combinations of aliphatic groups and cyclic groups, silyl groups, alkyl halide groups, halides, organometallic groups, phosphorus groups, nitrogen groups, silicon, phosphorous, boron, germanium or hydrogen; and wherein at least one substituent on ($X^2$) can be a bridging group which connects ($X^1$) and ($X^2$);

the at least one organoaluminum compound is trimethylaluminum; triethylaluminum; tripropylaluminum; tributylaluminum; or triisobutylaluminum; and the at least one treated solid oxide compound comprises at least one halogen, titanium, and at least one solid oxide compound;

wherein the at least one halogen is chlorine or fluorine; and wherein the at least one solid oxide compound is alumina or silica-alumina.

16. A process according to claim 15, wherein:

($X^1$) and ($X^2$) independently are a cyclopentadienyl, an indenyl, a fluorenyl, a substituted cyclopentadienyl, a substituted indenyl, or a substituted fluorenyl, and wherein each substituent on the substituted cyclopentadienyl, the substituted indenyl, or the substituted fluorenyl, independently is selected from hydrogen, methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, or phenyl; and ($X^3$) and ($X^4$) independently are a halide or a methyl group.

17. A process according to claim 15, wherein the at least one treated solid oxide compound further comprises at least one additional metal, and wherein the at least one additional metal is zinc, silver, copper, antimony, gallium, tin, nickel, tungsten, or any mixture thereof.

18. A process according to claim 15, wherein the polymerization conditions comprise slurry polymerization conditions.

19. A process according to claim 15, wherein at least one monomer is ethylene.

20. A process according to claim 15, wherein at least one monomer comprises ethylene and an aliphatic 1-olefin having from 3 to about 20 carbon atoms per molecule.

* * * * *